United States Patent [19]
Vollett

[11] Patent Number: 5,761,969
[45] Date of Patent: Jun. 9, 1998

[54] TORSIONAL VIBRATION DAMPER

[75] Inventor: Eric Malcolm Vollett, West Yorkshire, United Kingdom

[73] Assignee: Simpson Industries, Inc., Plymouth, Mich.

[21] Appl. No.: 702,621

[22] PCT Filed: Feb. 23, 1995

[86] PCT No.: PCT/GB95/00381

§ 371 Date: Jan. 21, 1997

§ 102(e) Date: Jan. 21, 1997

[87] PCT Pub. No.: WO95/23300

PCT Pub. Date: Aug. 31, 1995

[30] Foreign Application Priority Data

Feb. 25, 1994 [GB] United Kingdom ............... 9403643

[51] Int. Cl.[6] ..................................... F16F 15/10
[52] U.S. Cl. .................. 74/573 F; 74/574; 74/572; 464/66
[58] Field of Search ..................... 74/572, 573 F, 74/573 R, 574; 464/57, 62, 66, 77, 100; 192/61, 30 V

[56] References Cited

U.S. PATENT DOCUMENTS

| | | | |
|---|---|---|---|
| 3,730,457 | 5/1973 | Williams | 74/574 |
| 3,837,182 | 9/1974 | Kulhavy | 74/574 |
| 4,905,807 | 3/1990 | Rohs et al. | 192/61 |
| 4,944,279 | 7/1990 | Woodard | 464/66 |
| 5,048,658 | 9/1991 | Reik | 74/574 |
| 5,152,189 | 10/1992 | Miura et al. | 74/573 F |

FOREIGN PATENT DOCUMENTS 0 009 981   4/1980   European Pat. Off. .............. 74/573 F

*Primary Examiner*—Vinh T. Luong
*Attorney, Agent, or Firm*—Dykema Gossett PLLC

[57] ABSTRACT

A torsional vibration damper has an annular driven member and an annular inertia member, coaxial with the driven member. The inertia member is capable of limited rotational movement relative to the driven member. At least one set of variable volume chambers is arranged so that the relative movement of the driven and inertia members in a first direction decreases the volume of one of the chambers and increases the volume of the other chamber, and relative movement in the opposite direction causes a reverse variation in the volume of the chambers. At least one annular spring is carried by one of the driven and inertia members. A connection is provided between the variable volume chambers and at least one side of the spring. The damper is supplied with a source of fluid in the chambers whereby relative rotational movement of the drive and inertia members pressurizes the one side of the spring causing it to flex. At least one of the chambers is provided with inlet and outlet valves so as to enable it to pump fluid from the source of fluid to the pressurized side of the spring.

13 Claims, 6 Drawing Sheets

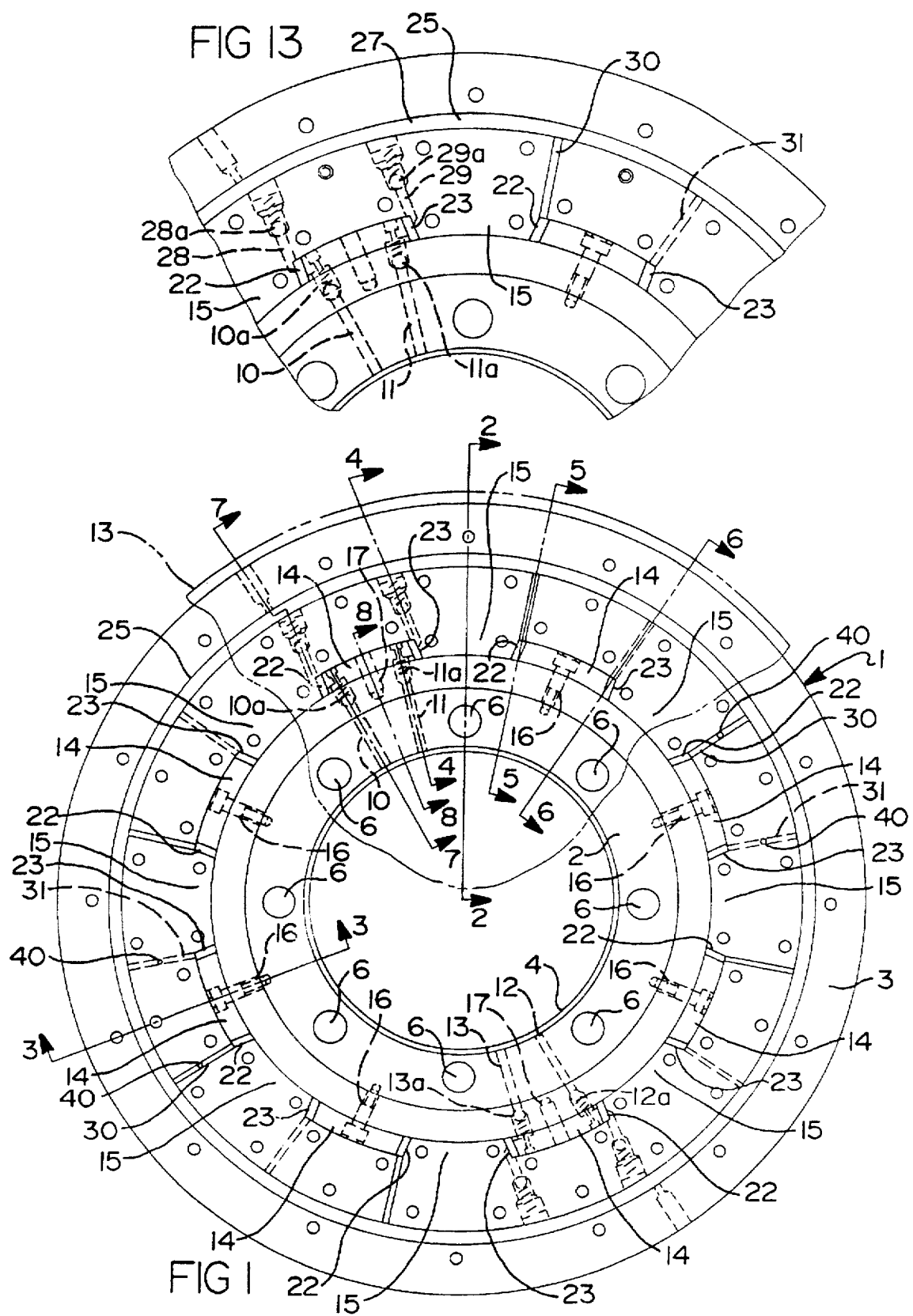

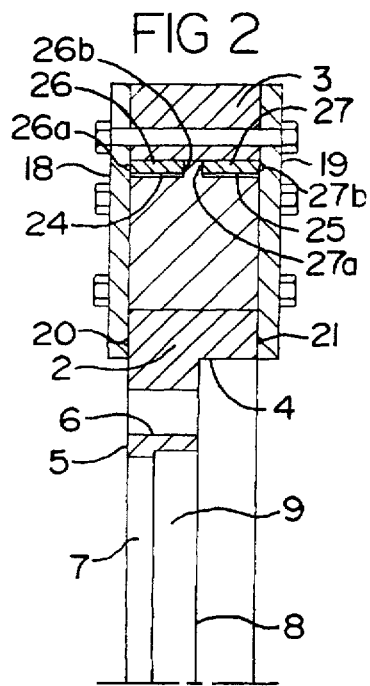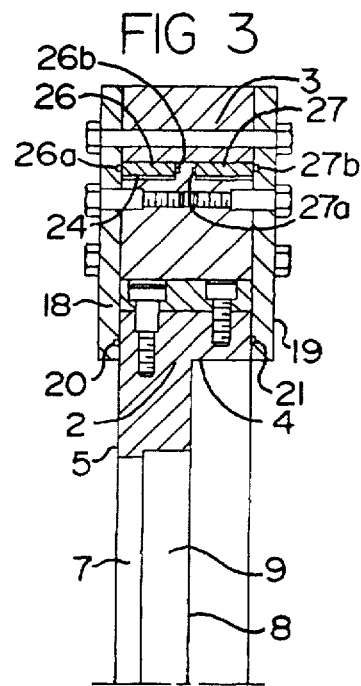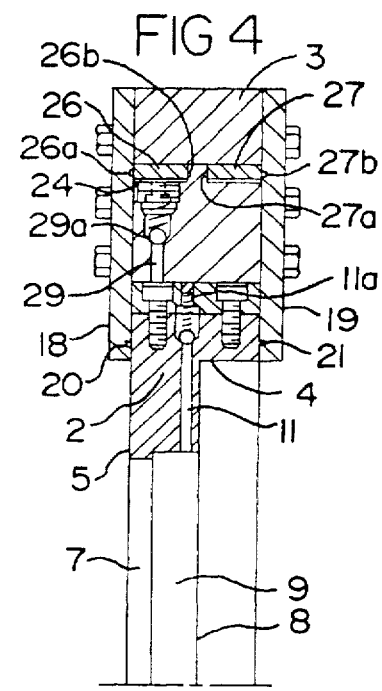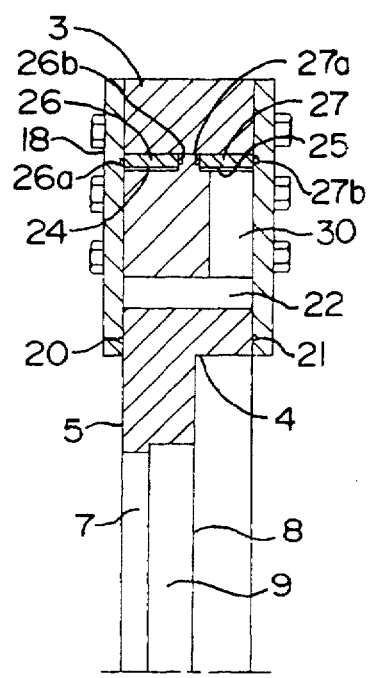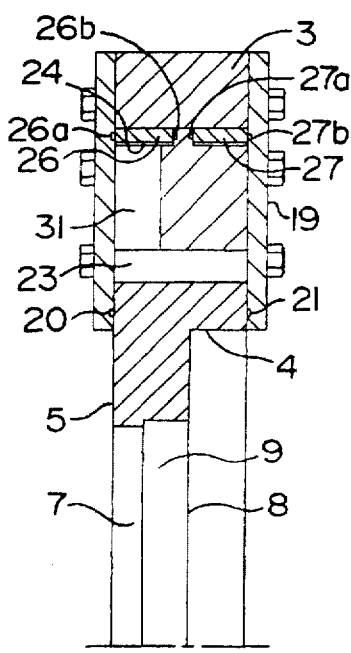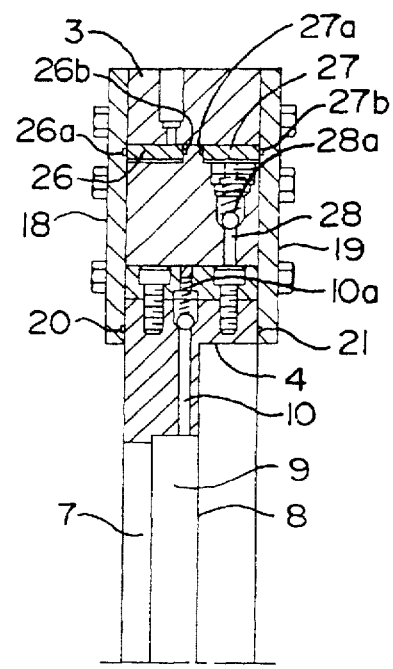

TORSIONAL VIBRATION DAMPER

FIELD OF THE INVENTION

This invention relates to a torsional vibration damper for use, for example, in damping the torsional vibrations of an engine crankshaft.

BACKGROUND OF THE INVENTION

It is known to provide a torsional vibration damper for an engine crankshaft in which a rotary body incorporates steel springs interconnecting inner and outer body members for relative rotation with a desired stiffness. Damping is achieved by pumping engine oil between different cavities within the damper construction. Such dampers may require the complex assembly of many precision machine parts which makes them inherently expensive.

Our U.K. Patent Application No.92 24489 describes a torsional vibration damper comprising:

an annular driven member, an annular inertia member, co-axial with said driven member and capable of limited rotational movement relative thereto, means fixed to said driven and inertia member means for forming at least one set of variable volume chambers arranged so that relative movement of said driven and inertia members in a first direction decreases the volume of one of said chambers and increases the volume of the other, relative movement in the opposite direction causing a reverse variation in the volume of said chambers, means for forming at least one annular spring carried by one of said members, and means for connecting said variable volume chambers to at least one side of said annular spring, said damper being supplied with a source of fluid in said chambers whereby relative rotational movement of said members pressurizes the one side of said annular spring means to cause it to flex in a circumferential direction.

In our previously proposed torsional vibration damper in accordance with the aforesaid patent application the pressure of the damping fluid in the region of the fluid inlets of the variable volume chambers may fall to the vapour pressure of the fluid. Any resulting vapour will interfere with pressurisation of the annular spring means and possibly prevent it flexing thereby rendering the damper ineffective. In addition, turbulent flow of damping fluid in the damping passages requires large pressure changes across the damping passages to sustain the flow, which may lead to local vapour pockets forming when the pressure drops below the vapour pressure. Finally, damping fluid can only flow into the variable volume chambers when the pressure therein is below the supply pressure and the proportion of the cycle time in which this occurs is severely limited.

SUMMARY OF THE INVENTION

It is an object of the present invention to provide a torsional vibration damper in which the above disadvantages are obviated or mitigated.

According to the present invention there is provided a torsional vibration damper comprising:

an annular driven member, an annular inertia member, co-axial with said driven member and capable of limited rotational movement relative thereto, means fixed to said driven and inertia members for forming at least one set of variable volume chambers arranged so that relative movement of said driven and inertia members in a first direction decreases the volume of one of said chambers and increases the volume of the other, relative movement in the opposite direction causing a reverse variation in the volume of said chambers, means for forming at least one annular spring carried by one of said members, and means for connecting said variable volume chambers to at least one side of said spring means, said damper being supplied with a source of fluid in said chambers whereby relative rotational movement of said members pressurizes the one side of said spring means to cause it to flex, characterised in that at least one of said chambers is provided with inlet and outlet valves so as to enable it to pump fluid from the source to the pressurized side of the spring.

Preferably, the spring means comprises two annular springs connected to respective pumping chamber sets for flexing the springs alternately in a circumferential direction during said relative movement of said driven and inertia members in opposite directions, the springs also being connected to respective non-pumping chamber sets so that pressurization of said chambers caused by return movement of the springs resists said relative movement.

The two pumping chamber sets are preferably provided at diametrically opposed locations and a plurality of second chamber sets are provided between said first sets.

Preferably, all the chambers sets are equiangularly spaced relative to each other.

Preferably, a pair of diametrically opposed non-pumping chamber sets is disposed symmetrically between said two pumping chamber sets and a pair of damping fluid outlet orifices is provided in the connections between each of said pair of pumping chamber sets and the respective springs.

Preferably, said means fixed to said driven and inertia members for forming said variable volume chamber sets comprise an axially segmented cylinder with alternate segments forming part of the driven member and intermediate segments forming part of the inertia member.

Preferably the connections between the spring means and the non-pumping chambers has a sufficiently large flow cross-section to avoid turbulence.

BRIEF DESCRIPTION OF THE DRAWINGS

FIG. 1 is a side view with side plate removed of one embodiment of torsional vibration damper in accordance with the present invention and the inset shows the indicated part of the drawing to an enlarged scale.

FIGS. 2 is a sectional view of the device of FIG. 1 in the direction of arrows 2.

FIG. 3 is a sectional view of the device of FIG. 1 in the direction of arrows 3.

FIG. 4 is a sectional view of the device of FIG. 1 in the direction of arrows 4.

FIG. 5 is a sectional view of the device of FIG. 1 in the direction of arrows 5.

FIG. 6 is a sectional view of the device of FIG. 1 in the direction of arrows 6.

FIG. 7 is a sectional view of the device of FIG. 1 in the direction of arrows 7.

FIG. 13 is an enlarged broken-out portion of FIG. 1 encircled by phantom line 13.

DETAILED DESCRIPTION OF A PREFERRED EMBODIMENT

Figure 8:
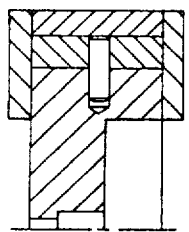
FIG. 8 is a sectional view of the device of FIG. 1 in the direction of arrows 8.

Referring now to FIGS. 1 to 8 of the drawings, the exemplified torsional vibration damper comprises a rotary body 1 of flat cylindrical shape having an inner hub member 2 and an outer inertia member 3. The members 2, 3 normally rotate in unison, for example with the end of an engine crankshaft, but torsional vibrations in the shaft tend to produce limited relative rotation of the hub member 2 with respect to the outer inertia member 3. The damping effect is achieved by damping such relative rotation. In the following description it is assumed that the vibration damper is intended for damping the torsional vibrations of an engine crankshaft using engine oil as a damping fluid. It will be appreciated, however, that alternative applications involving other damping fluids are possible.

The hub member 2 has a stepped bore 4 for receiving the end of a crankshaft (not shown but extending from the right in the sectional views of FIGS. 2 to 8) to which an inwardly projecting flange 5 of the hub member 2 is fixed by bolts (not shown) inserted through equiangularly spaced holes 6 (see particularly FIGS. 1 and 2). A cover (not shown) located at the left-hand end 7 of the bore 4 defines with the crankshaft end disposed on line 8 a central chamber 9 for holding engine oil supplied under pressure through the centre of the crankshaft. The hub member 2 is penetrated by two opposed pairs of radial flow passages 10, 11 and 12, 13 which interconnect the oil reservoir in the central chamber 9 with a damping pressure circuit to be described. The pressure of the oil and centrifugal force drive the oil in the central chamber 9 outwardly through the pairs of passages 10, 11 and 12, 13 which are provided at their outer ends with spring-loaded non-return ball valves 10a, 11a and 12a, 13a (see the sections of FIGS. 4 and 7 for detailed views of the radial passages 10, 11 and the respective valves 10a, 11a).

An outer part of the hub member 2 is provided by alternate segments 14 of an axially segmented cylinder with intervening alternate segments 15 forming an inner part of the outer inertia member 3. The segments 14 are connected to the main body of the hub member 2 by screws 16 or pins 17 and the segments 15 are integral with the main body of the outer member 3. Side plates 18, 19 (see FIGS. 2 to 8) are fixed to opposite sides of the outer member 3 by suitable fasteners as shown. The side plates 18, 19 overlap the hub member 2 and oil seals 20, 21 are provided at the contact surfaces. The cylinder segments 14, 15 are separated by axial gaps defining variable-volume chambers 22 and 23 to the left and right respectively of each segment 14 as seen in FIG. 1.

The outer member 3 is provided on opposite sides thereof with annular recesses forming spring chambers 24, 25 disposed in side-by-side relationship in the sectional views of FIGS. 2 to 7. Each chamber 24, 25 contains a respective spring 26, 27 which is preferably a non-laminated hollow cylindrical spring. Lateral seals 26a, b and 27a, b are provided for each spring 26, 27. That part of each spring chamber 24, 25 to the inside of the respective spring 26, 27 is connected to the variable volume chambers 22, 23.

The diametrically opposed pair of chamber sets 22, 23 defined by segments 14 traversed by oil supply passages 10, 11 and 12, 13 constitute pumping chambers. First and second pumping chambers 22, 23 form part of a pumping mechanism in which each segment 14 can be regarded as a double-acting piston sweeping an arcuate cylinder defined by the flanking segments 15 and the part of the outer member 3 between the segments 15. The variable volume chambers 22, 23 form part of the cylinder at opposite ends of the piston defined by the segment 14. Damping oil flows into the chambers 22, 23 via the inlet passages 10, 11, and 12, 13, and their respective inlet valves 10a, 11a, and 12a, 13a. As shown for one of the pumping chamber sets in the inset to FIG. 1, outlet passages 28, 29 from the pumping chambers 22, 23 extend radially through the outer member 3 to connect with the respective spring chambers 25, 24. The passages 28, 29 include respective non-return ball valves 28a, 29a which are spring-loaded to prevent return flow from the spring chambers. It will be appreciated that the other pumping chamber set is similarly connected to the spring chambers 24, 25. Third and fourth variable volume chambers 22, 23 of the other (non-pumping) chamber sets are connected to the respective spring chambers 25, 24 by radial slots 30, 31 (inset to FIG. 1 and FIGS. 5 and 6) of sufficiently large cross-section area to avoid turbulent flow.

Figure 14:
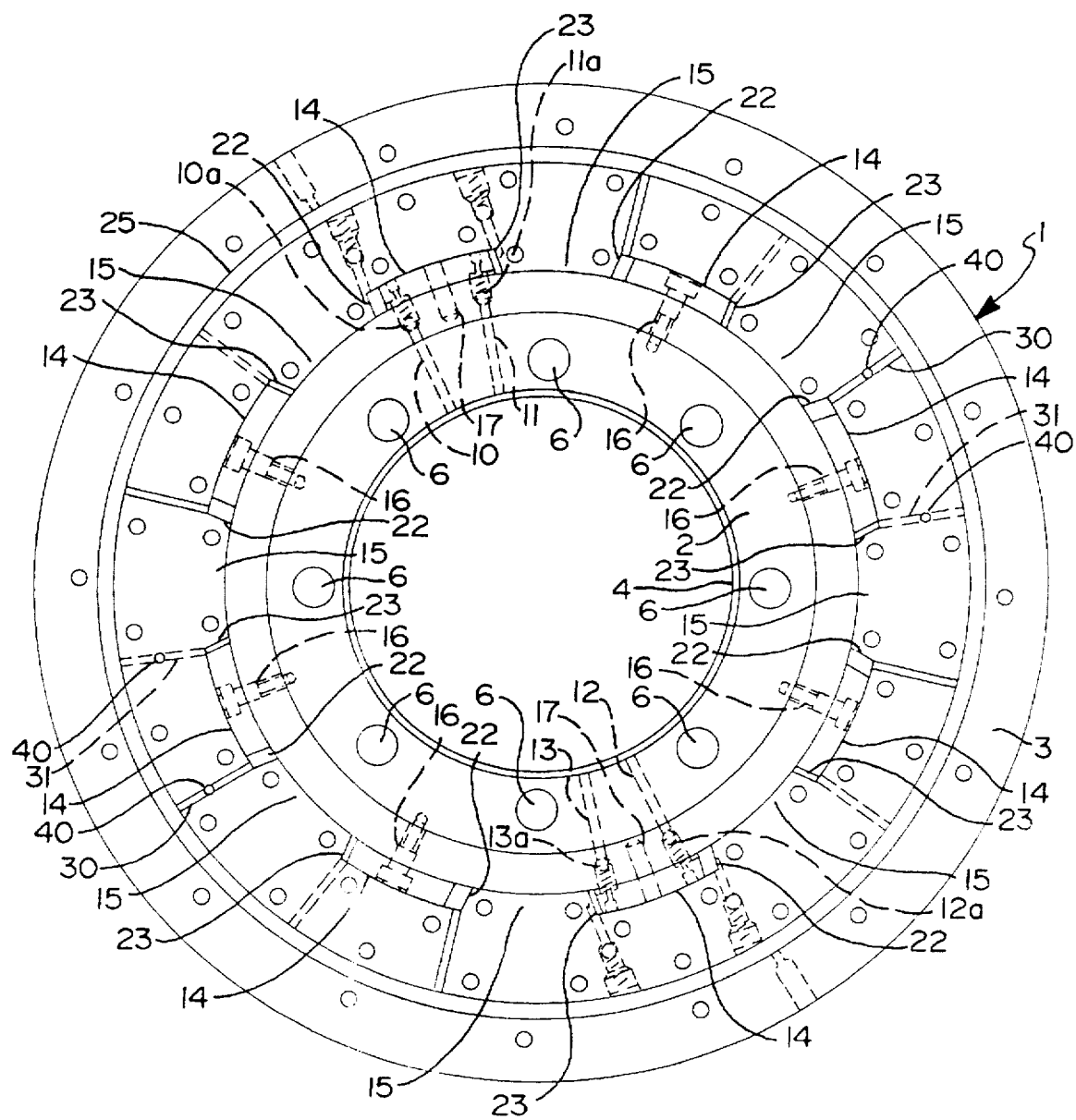
FIG. 14 is a side view of the embodiment of the torsional vibration damper of FIG. 1 showing a hub member rotated in a clockwise direction relative an inertia member.

In operation, torsional vibration in the crankshaft causes slight rotation of the hub member 2 relative to the outer inertia member 3. Assume that the hub member 2 in FIG. 1 rotates clockwise with respect to the stationary outer member 3 as shown in FIG. 14. The cylinder segment 15 forming part of the outer member 3 also remains stationary but the next following segment 14 forming part of the hub member 2 also moves clockwise. The leading chamber 23 of each chamber pair is therefore reduced in volume and the trailing chamber 22 is increased in volume. In the case of the two pairs of pumping chambers 22, 23 a pumping action ensues with damping oil being drawn through the radial passage 10 and 12 into the chamber 22 and damping oil being expelled from the chamber 23 via the outlet passages e.g. 29 to the spring chamber 24 causing the spring 26 to flex circumferentially. The increased pressure in the spring chamber 24 to the inside of the spring 26 is transmitted by the spring return pressure through the slots 31 to the variable volume chambers 23 of the second chamber set so as to resist clockwise rotational movement of the hub 2 relative to the outer member 3.

Figure 15:
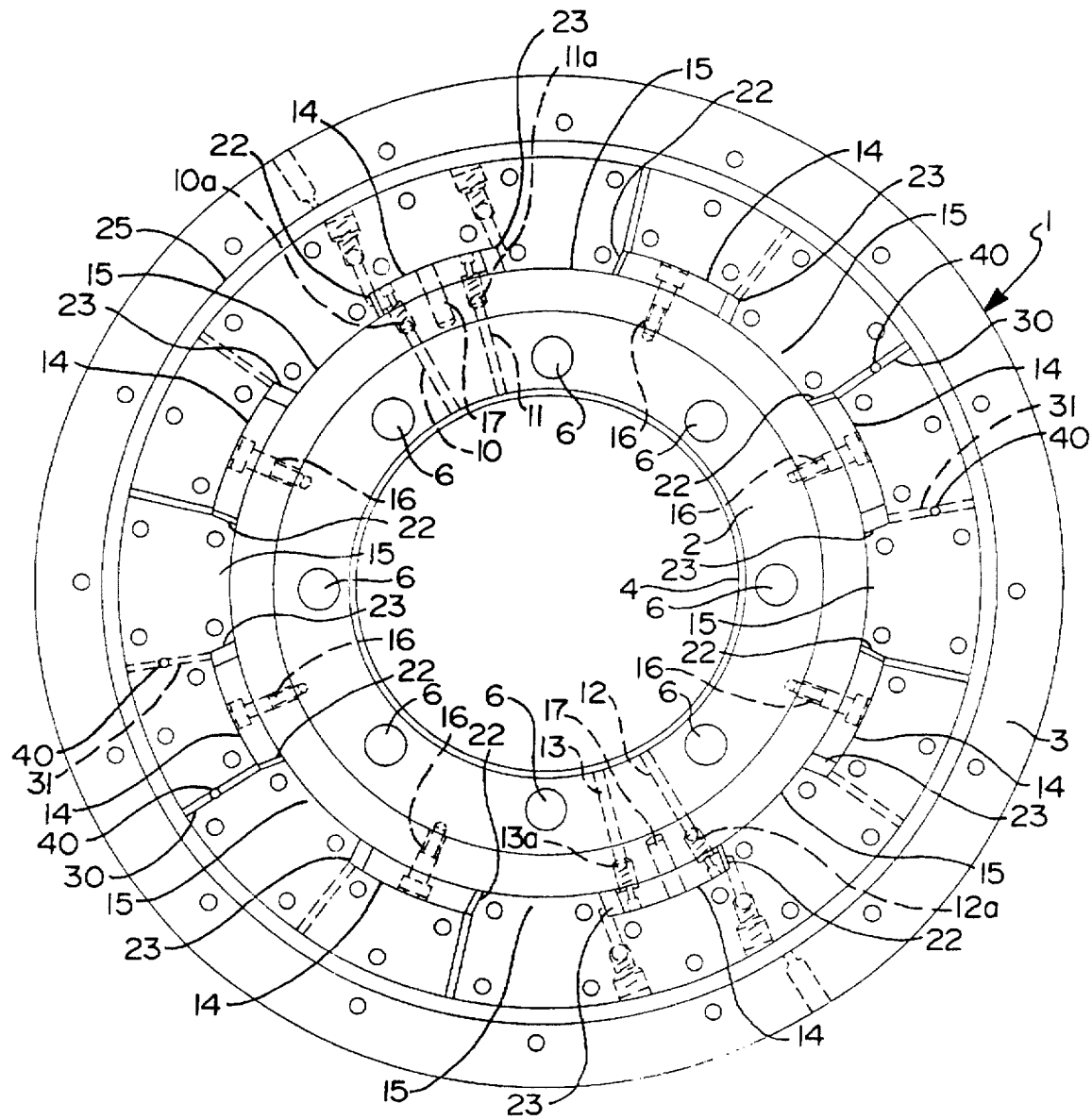
FIG. 15 is a side view of the embodiment of the torsional vibration damper of FIG. 1, with the hub member rotated in a counterclockwise direction relative to the inertia member.

If the hub member 2 as seen in FIG. 1 is now considered to be rotating anti-clockwise relative to the outer member 3, the chambers 23 will increase in volume while the chambers 22 decrease in volume as shown in FIG. 15. Damping oil is thus drawn into the pumping chambers 23 and expelled from the pumping chambers 22 through the outlet passages, e.g. 28, into the spring chamber 25 so as to flex the spring 27 circumferentially. The return force of the spring 27 transmits fluid pressure through the slots 30 to the variable volume chambers 22 of the second chamber set so as to resist the rotational movement of the hub 2 in the anti-clockwise direction.

The effect of torsional vibration is thus to pressurise the flow system upstream of the two pairs of outlet valves, e.g.

28a, 29a. Diametrically opposed pairs of slots 30, 31 arranged symmetrically with respect to the pumping segments 14 are connected with outlet orifices 40 in the adjacent side plates 18, 19 so as to permit a restricted flow of damping oil through the pressurised system and enabling the oil in the system to be cooled by make-up oil.

Damping is achieved by the flow of fluid through the outlet orifices 40 and also by the flow of fluid into the spring chambers 24, 25 through the outlet valves, e.g. 28a, 29a, of the pumping chambers 22, 23.

Figure 9:
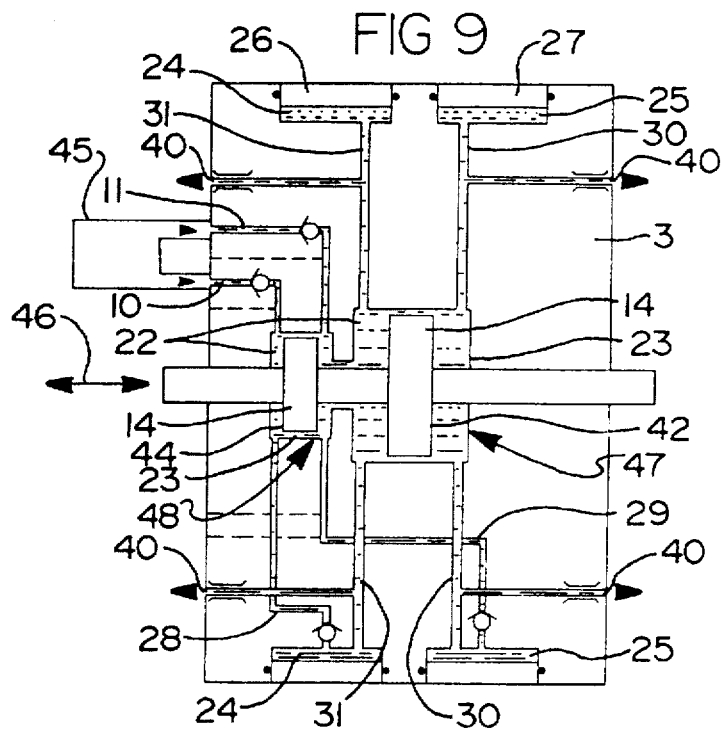
FIG. 9 is a diagrammatic representation of the fluid flow system of the torsional vibration damper shown in FIGS. 1 to 8.

The mode of operation is shown schematically in FIG. 9 in which piston 42 represents the segments 14 connected to the spring chambers 24, 25 by the slots 31, 30 also connected to the orifices 40 and piston 44 represents the segments 14 associated with the pumping chambers 22, 23. The rotor inertia member 3 has a mass M. A source or supply 45 shown schematically in FIG. 9 corresponds to chamber 9 which is supplied with pressurized engine oil. Arrow 46 shows the direction of movement of segments 14 responsive to excitation.

Figure 10:
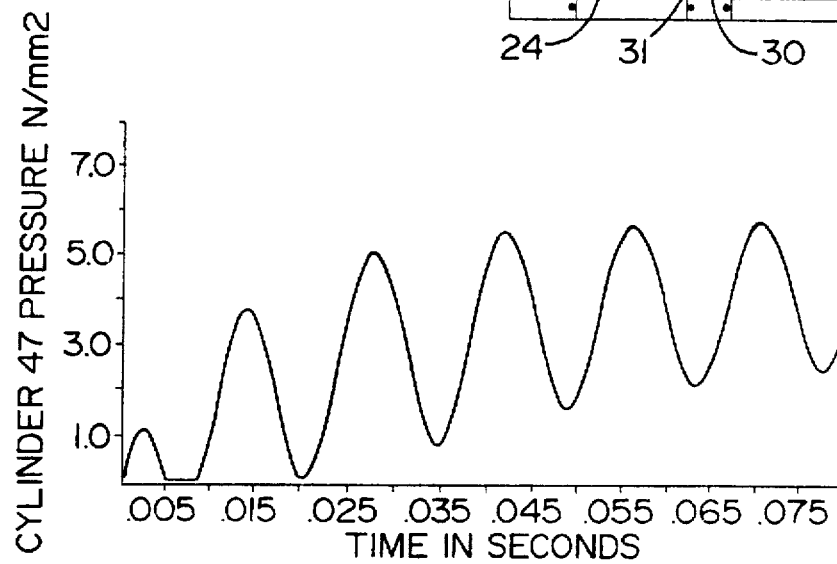
FIG. 10 is a graph showing the variation with time of the pressure in the cylinder a1 shown in FIG. 9.

FIG. 10 is a graph showing the pressure in the cylinder 47 shown in FIG. 9 and representing the pressure in the pressurised side of the damping system. It will be noted that the pressure increases from start-up to an elevated mean pressure.

Figure 11:
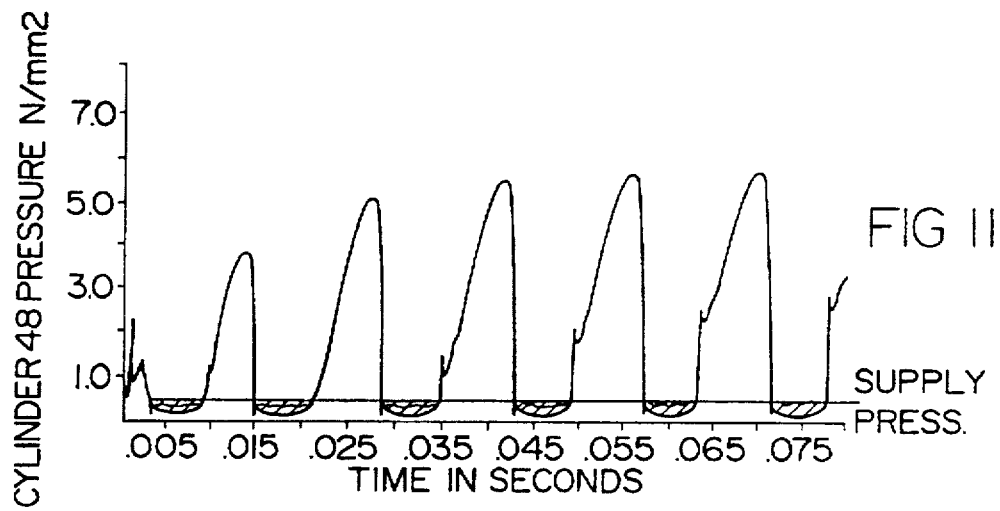
FIG. 11 is a graph showing the variation with time of the pressure in the cylinder b1 shown in FIG. 9.

FIG. 11 shows the pressure in the cylinder 48 of FIG. 9 as a series of peaks (the pressure stroke of the piston) and troughs (the induction stroke of the piston) with the shaded areas showing the extent to which the pressure in the cylinder 48 is below the supply pressure shown by the straight line parallel to the X axis.

Figure 12:
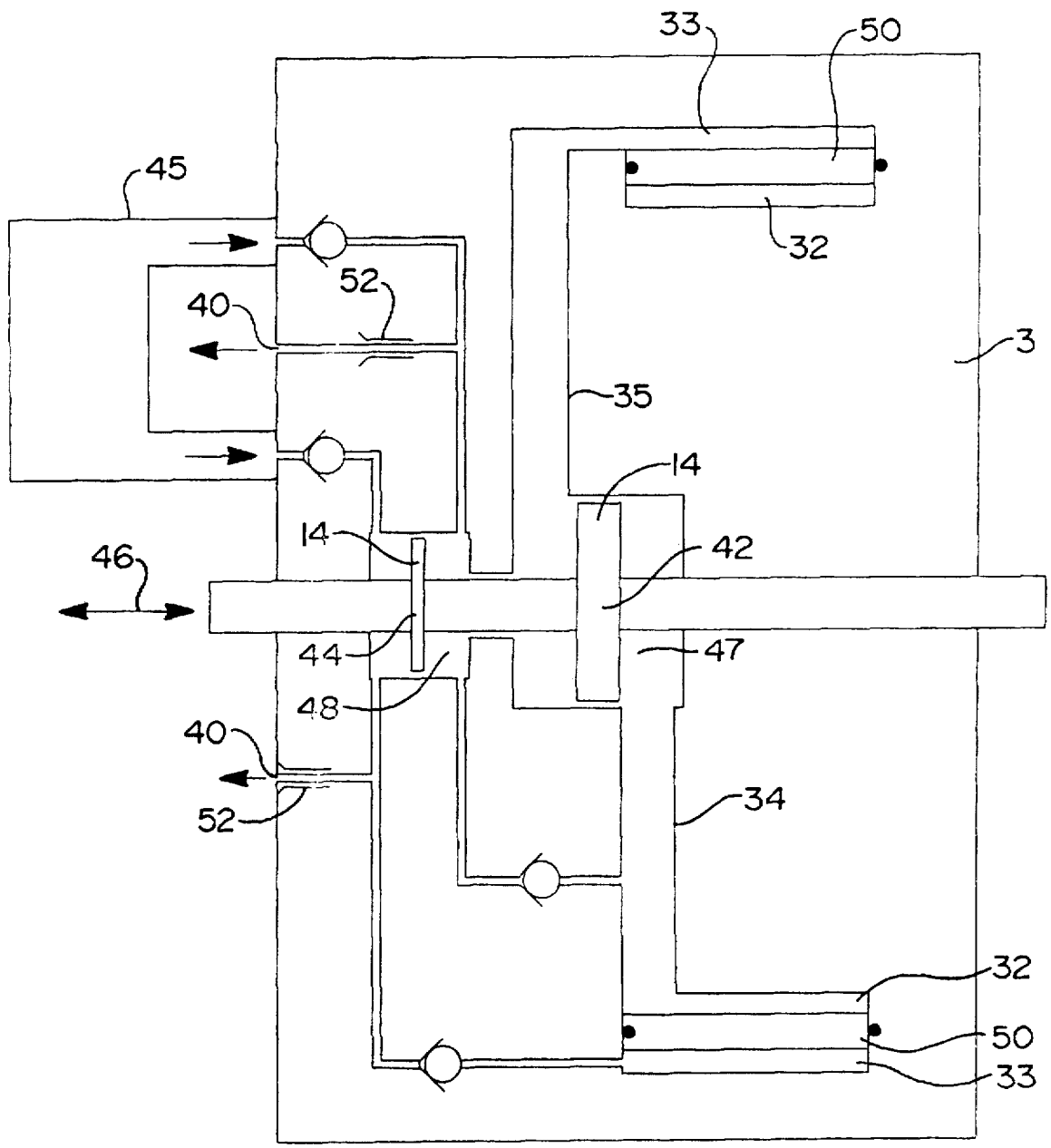
FIG. 12 is a diagrammatic representation of the fluid flow system of a modified torsional vibration damper.

It will be appreciated that numerous modifications may be made to the design described above without departing from the scope of the invention as defined in the appended claims. For example, the springs 26, 27 may be laminated or may be replaced by a single spring arrangement in accordance with any of the various embodiments described in our U.K. Patent Application No. 92 24489 (2261716). FIG. 12 is a diagrammatic representation of the fluid flow system of a modified torsional vibration damper with a single spring 50 and inner and outer spring chambers 32, 33. Parts corresponding to those shown in FIG. 9 are identified by the same reference numerals and letters and are not further described. The spring chambers 32, 33 are connected to opposite sides of piston 42 (representing segments 14) by slots 34, 35 respectively. It will be noted that in this case outlet orifices 40 are connected to inlet and outlet passages of cylinders 48 and include appropriately dimensioned chokes 52. The orifices 40 may be similarly connected in the FIG. 9 embodiment as indicated by the dotted lines.

I claim:

1. A torsional vibration damper comprising:
   an annular driven member,
   an annular inertia member, co-axial with said driven member and capable of limited rotational movement thereto,
   a plurality of alternate circumferential segments fixed to said driven and inertia members, the segments forming a first and a second variable volume chamber arranged so that relative movement of said driven and inertia members in a first direction decreases the volume of one of said variable volume chambers and increases the volume of the other, relative movement in the opposite direction causing a reverse variation in the volume of said chambers,
   a first annular spring carried by one of said members defining on a first side a first spring chamber fluidly connected with the first variable volume chamber, and a source of fluid fluidly connected with the first variable volume chamber, characterized in that said first variable volume chamber is provided with an inlet valve disposed between said source of fluid and said first variable volume chamber, the inlet valve configured and oriented to enable fluid flow into the first variable volume chamber from the source of fluid and restrict fluid flow therefrom, and is also provided with an outlet valve disposed between said first spring chamber and said first variable volume chamber, the outlet valve configured and oriented to enable fluid flow into the first spring chamber from the first variable volume chamber and restrict fluid flow therefrom, wherein relative rotational movement of said members pressurizes fluid within the spring chamber causing the annular spring to deflect and enabling the first variable volume chamber to pump fluid from the source to the first spring chamber.

2. A damper as claimed in claim 1, further comprising a second annular spring carried by one of said members and defining on a first side of said second spring a second spring chamber fluidly connected with the second variable volume chamber, the second variable volume chamber also being fluidly connected with said source of fluid, the springs alternately flexing in a circumferential direction during said relative movement of said driven and inertia members in opposite directions, the first and second spring chambers also being fluidly connected to respective third and fourth variable volume chambers also formed by said alternate circumferential segments and arranged so that relative movement of said driven and inertia members causes the volumes of the third and fourth variable volume chambers to increase and decrease
   wherein pressurization of said third and fourth variable volume chambers caused by return movement of the springs resists relative movement between said members.

3. A damper as claimed in claim 2, wherein two first and second variable volume chamber sets are provided at diametrically opposed locations and a plurality of third and fourth variable volume chamber sets are provided between said first and second variable volume chamber sets.

4. A damper as claimed in claim 3, wherein all the chamber sets are equiangularly spaced relative to each other.

5. A damper as claimed in claim 4, wherein a pair of diametrically opposed third and fourth variable volume chamber sets is disposed symmetrically between said first and second variable volume chamber sets and a pair of damping fluid outlet orifices is provided at locations between each of said pair of third and fourth variable volume chamber sets and the respective spring chambers.

6. A damper as claimed in claim 1, wherein said variable volume chambers are defined by said alternate segments forming part of the driven member and intermediate segments forming part of the inertia member.

7. A damper as claimed in claim 1 further comprising a second annular spring carried by one of said members and defining on a first side of said second spring a second spring chamber fluidly connected with the second variable volume chamber, the second variable volume chamber also being fluidly connected with said source of fluid, the springs alternately flexing in a circumferential direction during said relative movement of said driven and inertia members in opposite directions.

8. A damper as claimed in claim 7 further comprising:
   third and fourth variable volume chambers defined by other of said alternate circumferential segments and fluidly connected with said first and second spring chambers respectively, wherein pressurization of said third and fourth variable volume chambers caused by return movement of the springs resists relative movement between said members.

9. A damper as claimed in claim 1 wherein the valves are non-return valves.

10. A torsional vibration damper comprising:

an annular driven member, an annular inertia member, co-axial with said driven member and capable of limited rotational movement thereto, a plurality of alternate circumferential segments fixed to said driven and inertia members, the segments forming a first variable volume chamber and a second variable volume chamber arranged so that relative movement of said driven and inertia members in a first direction decreases the volume of one of said variable volume chambers and increases the volume of the other, relative movement in the opposite direction causing a reverse variation in the volume of said chambers, a first spring disposed at least in part a first spring chamber within one of said members and said first spring chamber being fluidly connected with the first variable volume chamber, a second spring disposed at least in part a second spring chamber within one of said members and said second spring chamber being fluidly connected with the second variable volume chamber, a source of fluid fluidly connected with the first variable volume chamber, a first inlet valve disposed between said source of fluid and said first variable volume chamber configured and oriented to enable fluid flow into the first variable volume chamber from the source of fluid and to restrict fluid flow therefrom, an first outlet valve disposed between said first spring chamber and said first variable volume chamber configured and oriented to enable fluid flow into the first spring chamber from the first variable volume chamber and to restrict fluid flow therefrom, a second inlet valve disposed between said source of fluid and said second variable volume chamber enabling fluid flow into the second variable volume from the source of fluid, and an second outlet valve disposed between said second spring chamber and said second variable volume chamber into the second spring chamber from the first variable volume chamber wherein relative rotational movement of said driven and inertia members pressurizes fluid within the spring chamber causes the springs to deflect and enables the variable volume chambers to pump fluid from the source to the first spring chamber.

11. A damper as claimed in claim 10, further comprising third and fourth variable volume chambers also formed by said alternate circumferential segments and arranged so that relative movement of said driven and inertia members causes the volumes of the third and fourth variable volume chambers to increase and decrease wherein pressurization of said third and fourth spring chambers caused by return movement of the springs resists relative movement between said members.

12. A damper as claimed in claim 11, wherein a pair of diametrically opposed third and fourth variable volume chamber sets is disposed symmetrically between a pair of diametrically opposed first and second variable volume chamber sets and a pair of damping fluid outlet orifices is provided at locations between each of said pair of said third and fourth variable volume chamber sets and the respective spring chambers.

13. A damper as claimed in claim 10 wherein the valves are non-return valves.

* * * * *